United States Patent
Boyer et al.

(10) Patent No.: US 10,410,437 B2
(45) Date of Patent: Sep. 10, 2019

(54) METHOD FOR AUTOMATICALLY ADAPTING THE CONDITIONS FOR ESTABLISHING A DIAGNOSTIC BY AN ON-BOARD DIAGNOSTIC SYSTEM

(71) Applicants: Continental Automotive France, Toulouse (FR); Continental Automotive GmbH, Hannover (DE)

(72) Inventors: Jean-Luc Boyer, Tournefeuille (FR); Frédéric Pasian, Lherm (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/769,524

(22) PCT Filed: Oct. 24, 2016

(86) PCT No.: PCT/EP2016/001759
§ 371 (c)(1),
(2) Date: Apr. 19, 2018

(87) PCT Pub. No.: WO2017/071800
PCT Pub. Date: May 4, 2017

(65) Prior Publication Data
US 2018/0315257 A1 Nov. 1, 2018

(30) Foreign Application Priority Data
Oct. 26, 2015 (FR) ...................................... 15 60191

(51) Int. Cl.
*G07C 5/04* (2006.01)
*G06G 7/00* (2006.01)
(Continued)

(52) U.S. Cl.
CPC ............ *G07C 5/04* (2013.01); *B60W 50/0205* (2013.01); *F01N 11/00* (2013.01); *F02D 41/22* (2013.01);
(Continued)

(58) Field of Classification Search
CPC .. G07C 5/04; G07C 5/00; F02D 29/02; G06F 7/00; G06F 17/00; G01M 15/00;
(Continued)

(56) References Cited

U.S. PATENT DOCUMENTS 4,185,494 A  1/1980 Yelke
5,041,980 A  8/1991 Maddock et al.
(Continued)

FOREIGN PATENT DOCUMENTS

CN 102680017 A 9/2012
DE 102011076509 A1 11/2012
(Continued)

OTHER PUBLICATIONS

International Search Report and Written Opinion for International Application No. PCT/EP2016/001759, dated Nov. 30, 2016, 11 pages.
(Continued)

*Primary Examiner* — Yuri Kan
(74) *Attorney, Agent, or Firm* — RatnerPrestia

(57) ABSTRACT

An automatic calibration method capable of adapting the set of conditions for performing hardware diagnostics, in an OBD system, with a view to optimizing the compromise between the number of diagnostics performed, in particular in order to comply with legislation relating to the ratio between the number of diagnostics performed on a component and the number of operating cycles, and the accuracy of the diagnostics.

8 Claims, 3 Drawing Sheets

(51) Int. Cl.
*F01P 7/14* (2006.01)
*F02D 41/22* (2006.01)
*F02D 41/24* (2006.01)
*F01N 11/00* (2006.01)
*B60W 50/02* (2012.01)
*F02D 41/14* (2006.01)

(52) U.S. Cl.
CPC ..... *F02D 41/2403* (2013.01); *F02D 41/2422* (2013.01); *B60W 2510/0676* (2013.01); *B60W 2520/10* (2013.01); *B60W 2540/30* (2013.01); *B60W 2550/00* (2013.01); *B60W 2550/12* (2013.01); *F01N 2550/00* (2013.01); *F01N 2900/0421* (2013.01); *F02D 41/1495* (2013.01); *Y02T 10/40* (2013.01); *Y02T 10/47* (2013.01)

(58) Field of Classification Search
CPC ......... G01M 3/04; G01M 17/00; H04L 29/08; F01P 7/14
See application file for complete search history.

(56) References Cited

U.S. PATENT DOCUMENTS

| | | | |
|---|---|---|---|
| 5,508,926 A | 4/1996 | Wade | |
| 5,926,486 A | 7/1999 | Siulinski | |
| 6,332,399 B1 | 12/2001 | Laucht et al. | |
| 6,435,018 B1* | 8/2002 | Murakami | G01C 21/20 340/438 |
| 2006/0224283 A1 | 10/2006 | Fussey et al. | |
| 2006/0241831 A1* | 10/2006 | Watanabe | B60W 50/0205 702/185 |
| 2007/0175414 A1* | 8/2007 | Miyahara | F01P 11/16 123/41.1 |
| 2009/0025458 A1* | 1/2009 | Ardash | F02D 41/221 73/49.7 |
| 2010/0253512 A1 | 10/2010 | Wagner et al. | |
| 2011/0313616 A1* | 12/2011 | Tsuchikiri | B60W 50/0205 701/33.7 |
| 2012/0027282 A1 | 2/2012 | Yoshikawa et al. | |
| 2012/0072060 A1* | 3/2012 | Zettel | B60W 50/0205 701/22 |
| 2013/0013174 A1 | 1/2013 | Nistler et al. | |
| 2013/0201020 A1 | 8/2013 | Mannheimer | |
| 2013/0201316 A1* | 8/2013 | Binder | H04L 67/12 348/77 |
| 2014/0058596 A1* | 2/2014 | Martin | B60W 50/0205 701/22 |
| 2014/0242491 A1 | 8/2014 | Maier et al. | |
| 2015/0134192 A1* | 5/2015 | Kakinuma | G07C 5/008 701/31.4 |

FOREIGN PATENT DOCUMENTS

| | | |
|---|---|---|
| DE | 102011101537 A1 | 11/2012 |
| EP | 1759725 A1 | 3/2007 |
| GB | 2513434 A | 10/2014 |
| JP | S57101939 A | 6/1982 |
| JP | S62185488 A | 8/1987 |
| JP | H0723926 A | 1/1995 |
| JP | H1085212 A | 4/1998 |
| JP | H10192275 A | 7/1998 |
| JP | 2000028140 A | 1/2000 |
| JP | 2007134146 A | 5/2007 |
| JP | 2009291809 A | 12/2009 |
| RU | 2344384 C1 | 1/2009 |
| WO | 2004072460 A1 | 8/2004 |
| WO | 2006005858 A1 | 1/2006 |

OTHER PUBLICATIONS

English Translation of the Written Opinion for International Application No. PCT/EP2016/001759, dated Nov. 30, 2016, 7 pages.

* cited by examiner

… (1) …

METHOD FOR AUTOMATICALLY ADAPTING THE CONDITIONS FOR ESTABLISHING A DIAGNOSTIC BY AN ON-BOARD DIAGNOSTIC SYSTEM

CROSS REFERENCE TO RELATED APPLICATIONS

This application is the U.S. National Phase Application of PCT International Application No. PCT/EP2016/001759, filed Oct. 24, 2016, which claims priority to French Patent Application No. 1560191, filed Oct. 26, 2015, the contents of such applications being incorporated by reference herein.

FIELD OF THE INVENTION

The invention relates to on-board diagnostic systems for motor vehicles, commonly referred to in this technical field using the name OBD systems as an acronym for on-board diagnostic. More precisely, the present invention targets a method aimed at optimizing the ratio between the number of on-board hardware diagnoses performed and the accuracy of said performed on-board hardware diagnoses, it being desired for said number and said accuracy of the diagnoses both to be as high as possible.

BACKGROUND OF THE INVENTION

Specifically, the main role of on-board diagnostic systems—or OBD systems—is to evaluate the hardware operation of vehicles, and they have the ability to diagnose the presence of a fault on a propulsion component of the vehicle. OBD systems therefore consist of a set of hardware and software means, making it possible to perform hardware diagnoses targeted at the engine of vehicles.

The subject of the present invention relates to the improvement of the operation of such OBD systems, for the purpose of optimizing the accuracy of the diagnoses performed and the number of times said diagnoses will be performed.

In a known manner, OBD systems hinge on on-board computers implementing methods for monitoring or observing components of the engine, for the purpose of carrying out the most relevant possible fault diagnoses.

In practice, when a malfunction occurs on a vehicle engine, the dedicated computer detects the presence of a fault, and the vehicle has to be taken to a specialist technician for the latter to carry out investigations. First of all, the specialist technician will connect a computer (termed 'diagnostic tool' or 'scan tool') to a special socket provided on the vehicle, generally called OBD socket, and execute, by way of software means, a method having a plurality of monitoring or observation strategies that are each able to process a plurality of components, for the purpose of performing the correct diagnosis, consisting in identifying the component responsible for the malfunction. Moreover, in practice, the same 'diagnostic tool' enables the competent authorities to monitor the efficiency of the vehicle's anti-pollution system.

In this context, a vital parameter for the purpose of analyzing the operation of the engine monitoring is based on the knowledge of a ratio, in particular referenced using the acronyms RBM for 'rate-based monitoring' or IUPR for 'in-use performance ratio'.

This ratio corresponds to the ratio between the number of times a given on-board hardware diagnosis is performed and the number of running cycles of the vehicle under consideration.

In most countries, legislation imposes that this ratio is higher than a predetermined threshold, so as to ensure, for reasons of reliability or to meet pollution minimization standards, that the engine is operating correctly by way of sufficiently frequent on-board hardware diagnoses. Depending on the hardware component under consideration, the predetermined threshold that the ratio has to exceed may vary. For example, it may be required for this ratio to be higher than 25%.

Now, moreover, in order to be relevant, the on-board hardware diagnoses may be performed only under certain conditions that are typically linked to the state of the vehicle, such as the temperature of the catalytic converter (is it hot enough?) or the engine speed (is it in fact between a certain minimum value and a certain maximum value?). Thus, some diagnoses, depending on the use of the vehicle, may be performed too infrequently, for example because said vehicle makes only small journeys at low speed, preventing the conditions for performing a given diagnosis, which conditions stipulate the requirement for the vehicle to be traveling at a relatively high speed for a certain duration, from being fulfilled.

It should furthermore be noted that particular attention is paid to any fault that may occur on components that are liable to bring about a risk of excess pollution.

Specifically, on-board diagnoses have generally become gradually more and more sophisticated, in particular so as to enable engines to comply with increasingly stringent legal polluting emissions thresholds.

Thus, complex legal requirements nowadays apply to motor vehicles, relating both to polluting emissions thresholds and methods and means to be implemented in order to detect any fault in the ability to control these emissions and to alert the user thereto.

These increasingly stringent legal requirements make optimum operation of OBD systems vital.

It should moreover be noted that there is a conflict between the desire to increase the number of times the diagnoses are performed, for the purpose of complying with the minimum RBM ratios, and the desire to perform accurate diagnoses. Specifically, if the conditions for performing a diagnosis are relaxed, the accuracy thereof is generally jeopardized. For example, some diagnoses may require the engine of the vehicle to be sufficiently hot. Now, if said vehicle makes only very short journeys, the temperature of its engine perhaps never reaches the high temperature required to perform said diagnosis. If a different calibration of the OBD system is implemented, so as to reduce the temperature threshold required for the diagnosis to be performed, said diagnosis will certainly be performed more often, but this will be to the detriment of the accuracy of said diagnosis, the latter being more accurate when the engine is hotter.

In an attempt to improve the ratio of the number of diagnoses performed to the number of running cycles of the vehicle, various methods have been developed. For example, document US 20120072060 A1, which is incorporated by reference proposes a method for monitoring an OBD system that makes it possible to identify the existence of an excessively low ratio and act, where appropriate, on the engine, so as to create the conditions for performing diagnoses.

In doing so, in the prior art, some hybrid vehicle OBD systems force the combustion engine to operate, while operation using electric power supplied by the battery is possible and less polluting, just to enable on-board hardware diagnoses to be performed on said combustion engine.

SUMMARY OF THE INVENTION

It is to overcome this type of drawback, and therefore passively optimize the ratio between the number of diagnoses performed on a given component and the accuracy of said diagnoses, that the method according to an aspect of the invention has been developed.

Thus, to enable the dynamic adjustment of the conditions for performing on-board hardware diagnoses depending on the use of the vehicle, for the purpose of optimizing the number of diagnoses performed and the accuracy thereof, the method according to the invention provides for implementing a set of calibrations selected dynamically and automatically, said set of calibrations comprising a plurality of conditions for performing a given on-board hardware diagnosis, leading to a certain level of accuracy of said diagnosis. In the method according to the invention, the level of accuracy of a given on-board hardware diagnosis is thus adjusted so as to be as high as possible, while at the same time complying with a predetermined minimum ratio of the number of diagnoses performed depending on the number of running cycles of the vehicle.

To this end, more precisely, an aspect of the invention relates to a method for establishing an on-board hardware diagnosis on board a vehicle, by way of a suitable computer executing the following steps:
i. calculating a ratio corresponding to the ratio between a number of instances of a diagnosis, corresponding to the number of times said diagnosis has been performed, and a number of running cycles of the vehicle, corresponding to the number of times said vehicle has had its engine started and has made at least one journey while fulfilling predetermined conditions of use,
ii. defining a configurable level of accuracy of the on-board hardware diagnosis, corresponding to one or more conditions for performing said diagnosis, said conditions being linked to the state of the vehicle, such as the temperature of the coolant or the speed of the vehicle, for example, and said level of accuracy being able to adopt a plurality of values in steps between a minimum level of accuracy and a maximum level of accuracy, said level of accuracy being able to be increased step by step, as far as the maximum level of accuracy, or reduced step by step, as far as the minimum level of accuracy,
iii. upon each new running cycle of the vehicle:
if said ratio is higher than a predetermined threshold plus a first margin, increasing the level of accuracy by one step, unless said level of accuracy is equal to the maximum level of accuracy,
if said ratio is lower than a predetermined threshold plus a second margin, the second margin being smaller than the first margin, reducing the level of accuracy by one step, unless said level of accuracy is equal to the minimum level of accuracy,
iv. performing the on-board hardware diagnosis under the performance conditions corresponding to the level of accuracy.

The method according to an aspect of the invention thus makes it possible to optimize the compromise between the number of diagnoses performed and the number of running cycles, and the accuracy of said diagnoses.

By way of nonlimiting example, according to one embodiment, the conditions for performing the on-board diagnosis comprise a condition pertaining to a minimum value and a maximum value of the temperature of the coolant, a condition pertaining to a minimum speed to be reached by the vehicle, and a condition pertaining to the steadiness of the speed of the vehicle for a determined duration.

According to one advanced embodiment, the conditions for performing the diagnosis are modified automatically by way of learning means, the conditions for performing the diagnosis being modified on the basis of the driving style of the driver of the vehicle and of the environment, such as the air temperature or the running profile.

For example, the predetermined ratio may be defined by the Euro 6 standard.

According to one advanced embodiment, prior to step iii., the method comprises verifying that the number of instances is greater than an instances of the diagnosis threshold and, if said number of instances is lower than said instances of the diagnosis threshold, awaiting the next performance of said diagnosis, doing so until said number of instances becomes greater than or equal to said instances of the diagnosis threshold.

For example, said instances of the diagnosis threshold is equal to 20.

An aspect of the invention also targets an on-board diagnostic system for a motor vehicle, that is to say an OBD system, comprising a computer comprising means for implementing the method such as briefly described above.

BRIEF DESCRIPTION OF THE DRAWINGS

The invention will be better understood upon reading the following description, given solely by way of example, and with reference to the appended drawings, in which.

The invention is presented primarily for the purpose of an application in the context of a motor vehicle on-board diagnostic system. However, other applications are also targeted by the present invention, all in particular implemented in any type of on-board diagnostic system of any type of vehicle, land vehicle or otherwise.

DETAILED DESCRIPTION OF THE PREFERRED EMBODIMENTS

Figure 1:
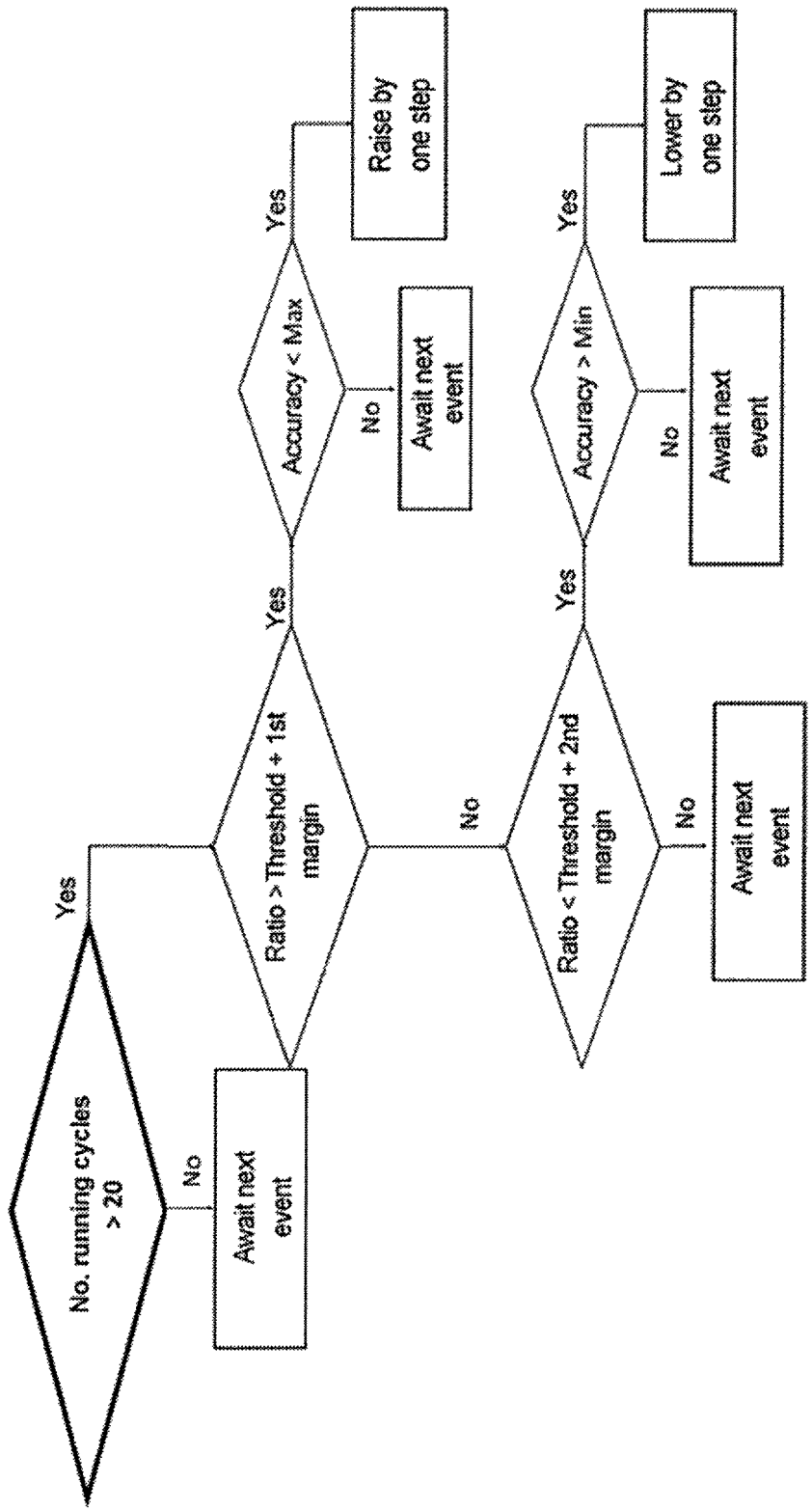
FIG. 1 shows a flow chart showing the principle of the method according to the invention.

With reference to FIG. 1, the present invention thus relates to a method for establishing an on-board hardware diagnosis on board a vehicle.

First of all, as explained above, the general problem, in the context of an aspect of the invention, lies in the ability to ensure that the ratio between the number of diagnoses performed and the number of running cycles is satisfactory, in particular in that it complies with the legislation in force.

A running cycle is defined as a set of conditions linked to the vehicle: starting thereof and the fulfillment of a certain number of conditions, such as reaching a certain speed, keeping the engine in the started state for a certain duration, continuously staying at warm idle speed for a predefined time, or else reaching a certain temperature of the engine, all of these having to be observed at an altitude that is not excessively high and at an ambient temperature that is not excessively cold.

The definition of a running cycle is given for example by the Euro 6 standard in relation to OBD systems; this definition will be retained in order to illustrate the present description.

The diagnoses performed on the components of the engine, in order to verify that it is operating correctly, also require the vehicle to have reached a state, that varies from one diagnosis to another, typically involving the temperature of the coolant being within a given range, or else the speed of the vehicle being substantially steady for a given period and within a certain range of values.

In many countries, legislation imposes that the ratio, calculated as the ratio of the number of diagnoses performed to the number of running cycles, is greater than a determined threshold, depending on the diagnosis.

For example, such ratios are for example imposed by the Euro 6 standard, and are generally of the order of 25%; however, they may vary from one component to another.

In practice, according to one preferred embodiment, it is furthermore necessary for a minimum number of running cycles, typically of the order of 20, to have been carried out in order to start to seek to optimize said ratio, in accordance with the method according to the invention.

Now, depending in particular on the driving style or on the type of journeys made most often by the vehicle, the conditions necessary for performing a diagnosis may be more or less difficult to fulfill. For example, recurrent journeys are made, but they are too short to enable the fulfillment of conditions required in terms of temperature of the coolant or speed of the vehicle.

Moreover, it is known that the accuracy of a diagnosis depends in particular on the conditions in which the engine and the vehicle are situated. For example, some diagnoses are performed more accurately at a high engine temperature, even though they are still able to be performed, with lower accuracy, at a lower engine temperature.

On account of this, in order to optimize the compromise between the number of diagnoses performed and the accuracy thereof, the invention provides for defining a plurality of calibration sets, corresponding to various levels of accuracy, ranging from the lowest level of accuracy to the highest level of accuracy.

Thus, in concrete terms, according to the invention, the level of accuracy of each on-board hardware diagnosis is configurable. This level of accuracy in fact corresponds to one or more conditions for performing said diagnosis, said conditions being linked to the state of the vehicle, such as the temperature of the coolant or the speed of the vehicle, for example.

As shown in the flow chart of FIG. 1, every twenty running cycles of the vehicle:
  if said ratio is higher than a predetermined threshold plus a first margin, the level of accuracy is increased by one step, unless said level of accuracy is already equal to the maximum level of accuracy,
  if said ratio is lower than a predetermined threshold plus a second margin, the second margin being smaller than the first margin, the level of accuracy is reduced by one step, unless said level of accuracy is already equal to the minimum level of accuracy.

The first margin thus makes it possible to detect the possibility of automatically changing the calibration for the purpose of changing to a more strict set of conditions for performing the diagnosis, for the purpose of improving the accuracy of said diagnosis.

The second margin, by contrast, makes it possible to detect the need to relax the conditions for performing the diagnosis so as to keep a satisfactory ratio of the number of diagnoses performed to the number of running cycles.

In this context, when the level of accuracy thus configured enables the vehicle to fulfill the conditions for performing a diagnosis, the latter is performed, with better accuracy achievable given the conditions relating to the state of the vehicle (temperature of the coolant, speed, etc.).

For example, it may be decided, in the context of the implementation of the method according to the invention, to define five levels of accuracy, ranging from the lowest to the highest, the level of accuracy by default being the third level of accuracy, corresponding to a medium level of accuracy.

Figure 2:
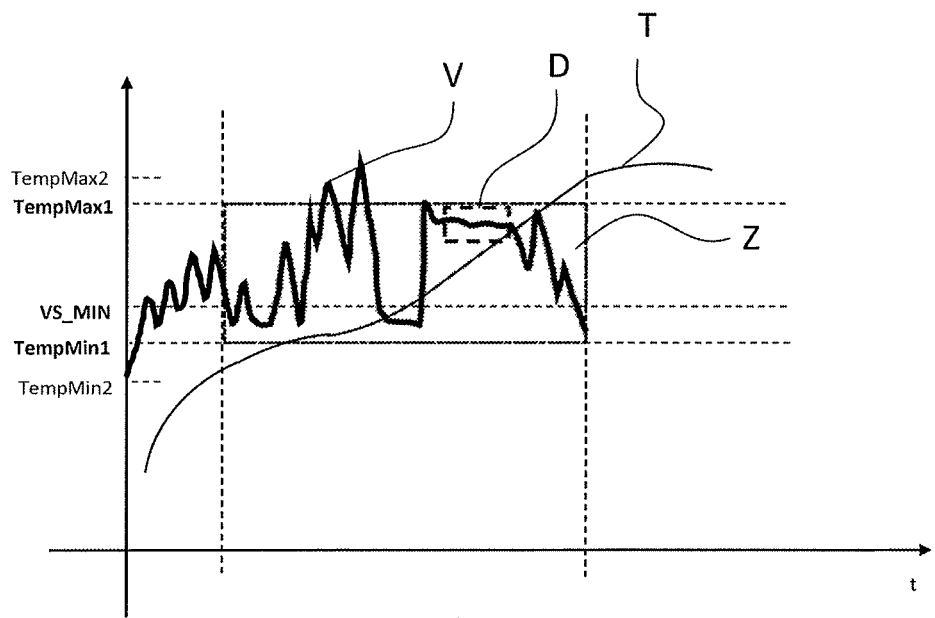
FIG. 2 shows a diagram corresponding to the establishment of a diagnosis associated with strict performance conditions.
Figure 3:
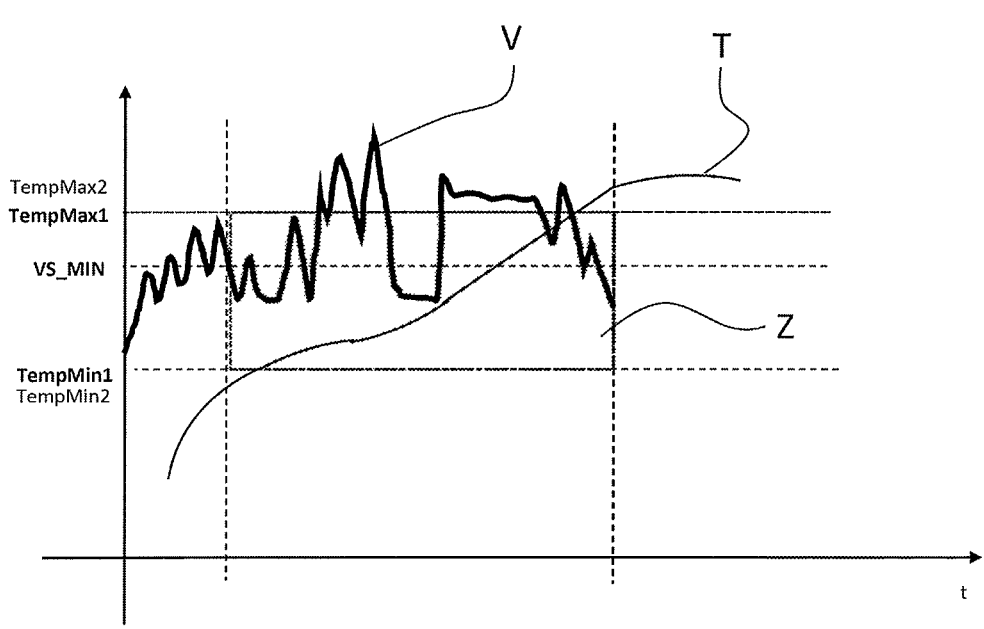
FIG. 3 shows a diagram corresponding to the lack of establishment of a diagnosis associated with strict performance conditions.
Figure 4:
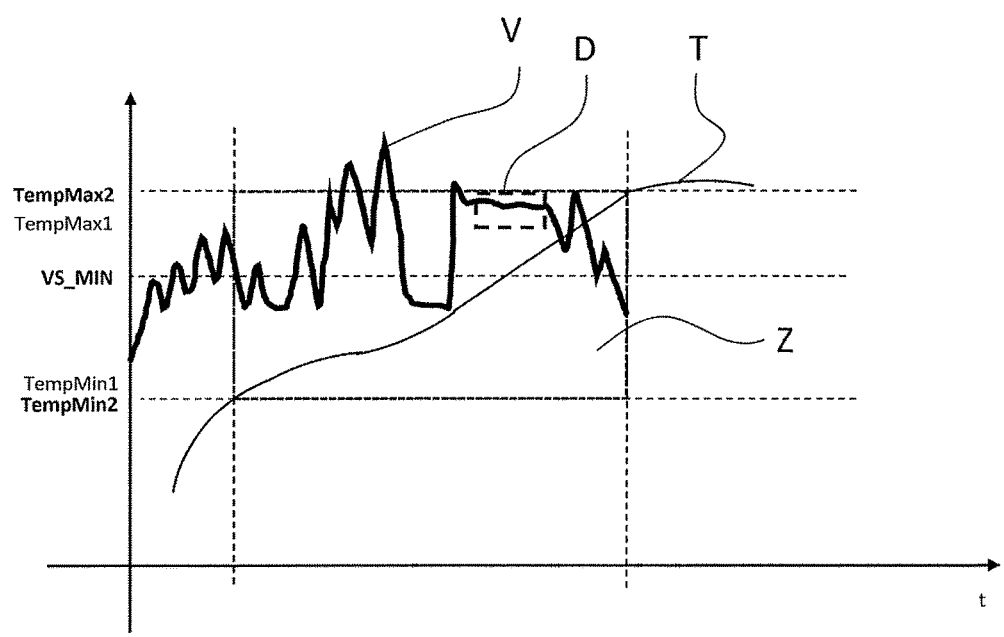
FIG. 4 shows a diagram corresponding to the establishment of a diagnosis associated with relaxed performance conditions.

By way of illustration of the method according to the invention, FIGS. 2, 3 and 4 show a plurality of scenarios in which a given hardware diagnosis is or is not performed, depending on the level of accuracy, and therefore on the set of performance conditions, as configured automatically by the method according to the invention.

FIGS. 2, 3 and 4 thus show the evolution of the temperature of the coolant T and of the speed of the vehicle V as a function of the time t.

In FIG. 2, the hardware diagnosis D is performed correctly. Specifically, the calibration is carried out in such a way that the set of conditions is associated with a minimum temperature TempMin1 of the coolant and a maximum temperature TempMax1 of the coolant, resulting in the definition of the diagnosis zone Z, corresponding to a coolant temperature zone in which a diagnosis is possible a priori. The other conditions for performing the diagnosis are in this case reaching the minimum speed VS_MIN and the steadiness of the speed V of the vehicle at a speed greater than VS_MIN for a sufficient duration. This set of conditions for performing the hardware diagnosis under consideration is given only by way of illustration.

Now, given the temperature T and vehicle speed V curves, the performance conditions are indeed fulfilled. The diagnosis D is therefore performed, with a level of accuracy corresponding to the determined set of performance conditions.

Therefore, by applying the method described above, an attempt may be made to increase the accuracy of the hardware diagnosis by toughening the conditions for performing said diagnosis.

In FIG. 3, the conditions for performing the hardware diagnosis are the same as in FIG. 1, corresponding to one and the same level of accuracy of the diagnosis. However, the use of the vehicle is not the same, and the temperature T of the coolant and speed V of the vehicle curves are different, such that the current conditions for performing the hardware diagnosis under consideration, in particular the chosen temperature range TempMin1-TempMax1, are not fulfilled, either in that the maximum temperature TempMax1 permitted for the coolant is exceeded, or in that the required minimum speed VS_MIN is not reached.

The hardware diagnosis is therefore not able to be performed.

Now, by applying the method described in particular with reference to FIG. 1, if the ratio of the number of diagnoses performed to the number of running cycles is not satisfactory, the calibration of the set of conditions for performing the diagnosis is relaxed such that, according to the example under consideration, the required temperature range for the coolant now corresponds to the broader range ranging from TempMin2 to TempMax2, as shown in FIG. 4.

By relaxing the conditions for performing the diagnosis, the diagnosis D is thus effectively carried out, but with a lower level of accuracy, as explained above.

Thus, by applying the method according to an aspect of the invention, with the conditions of the first calibration set, with TempMin1 and TempMax1, corresponding to a high level of accuracy, not being fulfilled, and in any case not often enough to achieve a satisfactory ratio, the desired level of accuracy is reduced by one step, such that the conditions for performing the diagnosis, corresponding to the level of accuracy reduced by one step, are fulfilled. On account of this, it has become possible to perform the corresponding hardware diagnosis, albeit with a lower level of accuracy.

Reciprocally, when the conditions for performing a diagnosis corresponding to a low level of accuracy are fulfilled, the method according to the invention provides for testing the fulfillment of the performance conditions corresponding to the level of accuracy that is one step higher, using the first margin, to perform, where appropriate, the hardware diagnosis with greater accuracy.

Thus, in summary, the present invention proposes an automatic calibration method that is able to adjust the set of conditions for performing hardware diagnoses, in an OBD system, for the purpose of optimizing the compromise between the number of diagnoses performed, in particular in order to comply with legislation pertaining to the ratio between the number of diagnoses performed on a component and the number of running cycles, and the accuracy of said diagnoses.

It should be noted, furthermore, that the invention is not limited to the embodiment described by way of example and that variants within the scope of the person skilled in the art may be envisioned.

The invention claimed is:

1. A method for establishing an on-board hardware diagnosis on board a vehicle, by way of a suitable computer executing the following steps:
   i. calculating a ratio corresponding to a ratio between a number of instances of a diagnosis, corresponding to the number of times said diagnosis has been performed, and a number of running cycles of the vehicle, corresponding to a number of times said vehicle has had its engine started and has made at least one journey while fulfilling predetermined conditions of use,
   ii. defining a configurable level of accuracy of the on-board hardware diagnosis, corresponding to one or more conditions for performing said diagnosis, said conditions being linked to a state of the vehicle, based on at least one of a coolant temperature or a speed of the vehicle, and said level of accuracy being able to adopt a plurality of values in steps between a minimum level of accuracy and a maximum level of accuracy, said level of accuracy being able to be increased step by step, as far as the maximum level of accuracy, or reduced step by step, as far as the minimum level of accuracy,
   iii. upon each new running cycle of the vehicle:
      if said ratio is higher than a predetermined threshold plus a first margin, increasing the level of accuracy by one step, unless said level of accuracy is equal to the maximum level of accuracy, and
      if said ratio is lower than said predetermined threshold plus a second margin, the second margin being smaller than the first margin, reducing the level of accuracy by one step, unless said level of accuracy is equal to the minimum level of accuracy, and
   iv. performing the on-board hardware diagnosis under performance conditions corresponding to the level of accuracy.

2. The method as claimed in claim 1, wherein the conditions for performing the on-board diagnosis comprise a condition pertaining to a minimum value and a maximum value of the coolant temperature, a condition pertaining to a minimum speed to be reached by the vehicle, and a condition pertaining to a steadiness of the speed of the vehicle for a determined duration.

3. The method as claimed in claim 1, wherein the conditions for performing the diagnosis are modified automatically by way of computer, the conditions for performing the diagnosis being modified on the basis of a driving style of a driver of the vehicle and of an environment.

4. The method as claimed in claim 1 comprising, prior to step iii., verifying that the number of instances is greater than a number of instances, or instances of the diagnosis threshold and, if said number of instances is lower than said instances of the diagnosis threshold, awaiting the next performance of said diagnosis, doing so until said number of instances becomes greater than or equal to said instances of the diagnosis threshold.

5. The method as claimed in claim 4, wherein the instances of the diagnosis threshold is equal to 20.

6. An on-board diagnostic system for a motor vehicle, comprising a computer for implementing the method as claimed in claim 1.

7. The method as claimed in claim 2, wherein the conditions for performing the diagnosis are modified automatically by way of a computer, the conditions for performing the diagnosis being modified on the basis of a driving style of a driver of the vehicle and of an environment.

8. The method as claimed in claim 1, wherein the conditions for performing the diagnosis are modified on the basis of a driving style of a driver of a vehicle and an air temperature or a running profile.

* * * * *